United States Patent [19]
Fujihara et al.

[11] Patent Number: 5,320,434
[45] Date of Patent: Jun. 14, 1994

[54] SWING LADDER BEARING

[75] Inventors: Hideo Fujihara, Fujisawa; Hidenobu Magami, Yokohama; Keizo Ishihara, Tokyo; Yukio Sato, Yokohama, all of Japan

[73] Assignee: NSK Ltd., Tokyo, Japan

[21] Appl. No.: 84,141

[22] Filed: Jul. 1, 1993

[30] Foreign Application Priority Data
Jul. 10, 1992 [JP] Japan .................................. 4-183491

[51] Int. Cl.⁵ ............................................. F16C 19/10
[52] U.S. Cl. ...................................... 384/620; 384/618
[58] Field of Search ................ 384/620, 618, 621, 222, 384/623, 613

[56] References Cited
U.S. PATENT DOCUMENTS
2,584,652  2/1952  Ablett ................................... 384/620
5,110,223  5/1992  Koch et al. ........................... 384/620

FOREIGN PATENT DOCUMENTS
59-16264  1/1984  Japan .
59-16265  1/1984  Japan .

Primary Examiner—Lenard A. Footland
Attorney, Agent, or Firm—Shapiro and Shapiro

[57] ABSTRACT

A thrust bearing for use in a rolling mill, having a pair of each of working rolls and stay rolls as well as a mechanism for crossing the rolls, is provided with retainers in which pockets for retaining rolling bodies are arranged in a plurality of rows. Each rolling body, when accommodated in the pocket, has the rotating axis passing substantially the center of swing motions, which makes the bearing appropriate to the swing motions of the rolling mill. Also, centering mechanisms, collar members and stoppers are provided for the retainers, so that malfunctions can be effectively prevented.

1 Claim, 4 Drawing Sheets

SWING LADDER BEARING

BACKGROUND OF THE INVENTION

1. Field of the Invention

The present invention relates to a thrust bearing for use in a rolling mill having a pair each of working rolls and stay rolls as well as a mechanism for crossing the rolls.

2. Related Background Art

FIG. 5 shows in cross-section a main portion of a four-stage rolling mill which is a kind of conventional rolling mills. In FIG. 5, an upper working roll 102 and a lower working roll 103 are located vertically adjacent to each other. Above the upper working roll 102, there is arranged an upper stay roll 101, while a lower stay roll 104 is arranged below the lower working roll 103. A material to be rolled is passed between the upper and lower working rolls to be rolled in an appropriate thickness, where bending of the upper and lower working rolls, occurring due to the reaction of the rolling is prevented by the upper and lower stay rolls. It should be noted that the left side of FIG. 5 constitutes a driving side provided with a driving mechanism (not shown) for transmitting a rotating force to the rolls, while the right side of the same is made dismountable for maintenance or the like. Therefore, each of the rolls is rotatably supported by an upper stay roll chock 111, an upper working roll chock 112, a lower working roll chock 113, or a lower stay roll chock 114, respectively. These roll chocks are attached to a mill housing (not shown) which is a rigid body.

In recent years, a new type of rolling mill has been developed for the purpose of improving the plate manufacturing accuracy. Such a new type of rolling mill having a cross mechanism will be briefly explained with reference to FIGS. 3 and 4. FIG. 3 shows a main portion of the rolling mill having a cross mechanism, viewed from one side thereof. FIG. 4 shows a top plan view of a roll which is swung by the cross mechanism.

Conventional rolling mills have a problem that the thickness of a rolled material near the ends of a roll tends to be smaller than that of a central portion of the roll. To solve this problem, rolls have been provided with a crowing, a roll bending mechanism has been equipped between upper and lower roll chocks, and so on. However, the improvement in the plate manufacturing provided by these methods was limited. The new type of rolling mill is constructed such that an upper working roll and an upper stay roll are swung or crossed with respect to a lower working roll and a lower stay roll, and the rolling is performed in this state. Explaining with reference to FIG. 4, a one-dot chain line X—X represents the axis of the upper working roll and the upper stay roll, while a one-dot chain line Y—Y represents the axis of the lower working roll and the lower stay roll (not shown). An angle formed by both the axes is designated α. By adjusting this angle α, that is, by appropriately swinging the rolls, a material can be rolled in a uniform thickness.

Referring now to FIG. 3, an upper stay roll chock 111 is downwardly urged through a thrust bearing 107 by a pressing device 105 which may be a hydraulic device, by way of example. Likewise, a lower stay roll chock 114 is attached to a mill housing 106 through a thrust bearing 108. A cross mechanism, not shown, causes each of the rolls and each of roll chocks to swing.

Incidentally, moving the pressing device 105 and the mill housing together with the roll chocks and so on causes the apparatus to be undesirably large and complicated, so that a thrust bearing need be inserted between the roll chocks and the pressing device or the mill housing. However, since the relative motion thereof is not linear motion but swing motion, a normal direct-acting rudder bearing cannot be used for this purpose. Moreover, this portion is an important portion which is applied with a large load, so that measures should be taken to prevent defective operation of the bearing.

SUMMARY OF THE INVENTION

It is an object of the present invention to provide a swing ladder bearing suitable for use in a rolling mill having a cross mechanism.

To achieve the above object, a swing ladder bearing of the present invention has a pair of rectangular trajectory plates subjected to an axial load, one of which is arranged to swing with respect to the other one; rolling bodies rotatably arranged between the pair of trajectory plates; a plurality of retainers for retaining the rolling bodies; and centering mechanisms for urging the retainers toward a neutral position, wherein:

collar members are attached to at least one of the pair of trajectory plates for guiding swing motions of the retainers caused by swing motions of the one trajectory plate;

stoppers are attached to at least one of the pair of trajectory plates for preventing the retainers from excessively swinging;

pockets are arranged in a plurality of rows in the retainers for retaining the rolling bodies, where each pocket is inclined such that the center line thereof passes the center of the swing motion;

and the retainers are each divided into a plurality of segments which are symmetric about the bearing center.

According to the swing ladder bearing of the present invention, since the trajectory plates are rectangular, they can be securely mounted to a portion of a rolling mill having a cross mechanism which is urged by a pressing device. Also, the retainers have pockets for retaining the rolling bodies arranged in a plurality of rows, with the center line of each pocket passing the center of the swing motion, thereby rendering the swing ladder bearing appropriate to the swing motion of the rolling mill. Further, since the centering mechanisms, the collar members and the stoppers are provided for the retainers, malfunctions can be effectively prevented.

DETAILED DESCRIPTION OF THE PREFERRED EMBODIMENTS

A swing ladder bearing according to one embodiment of the present invention will hereinafter be explained with reference to the accompanying drawings.

Figure 1:
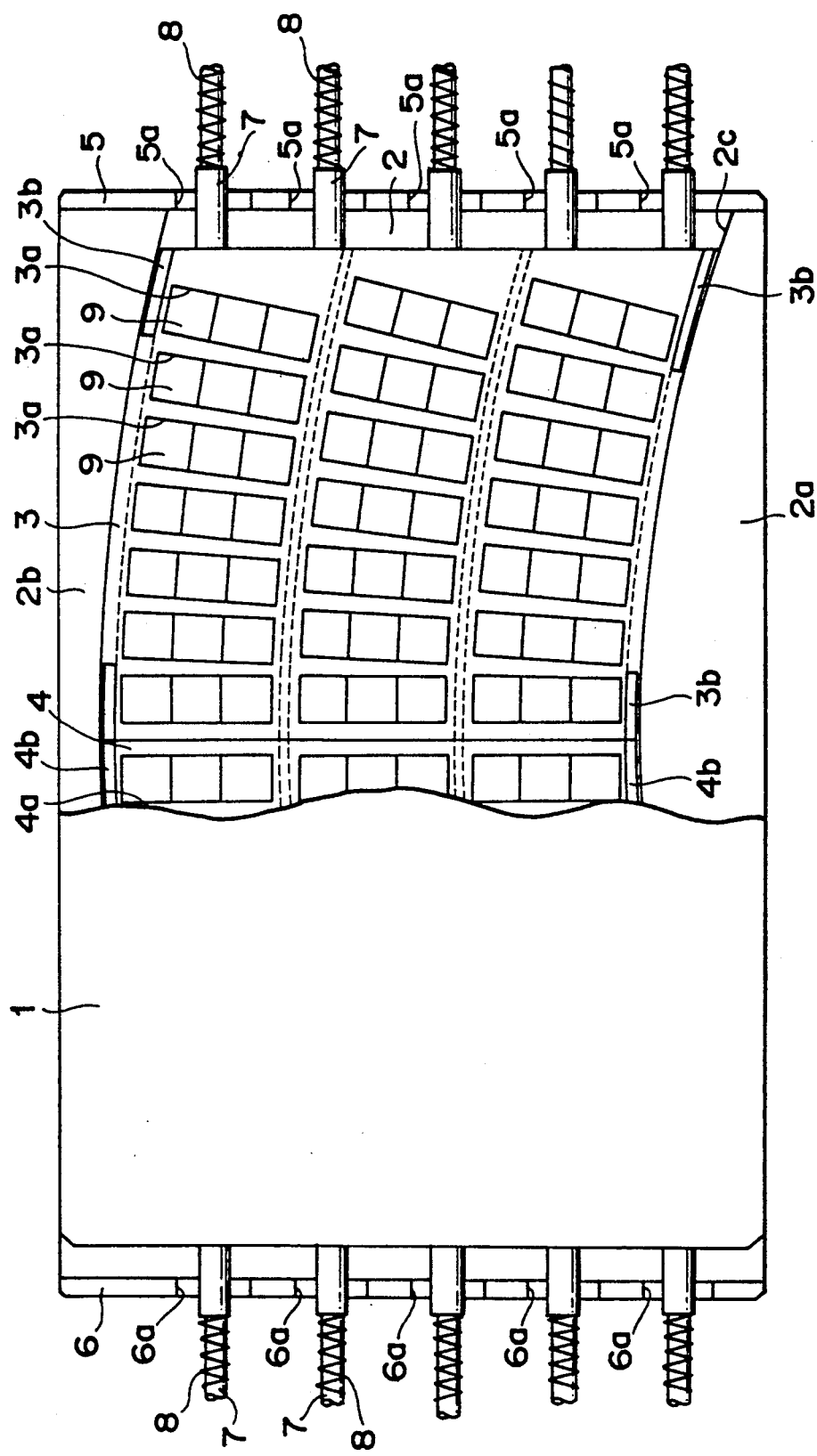
FIG. 1 is a front view of a swing ladder bearing according to the present invention with a part thereof being omitted.
Figure 2:
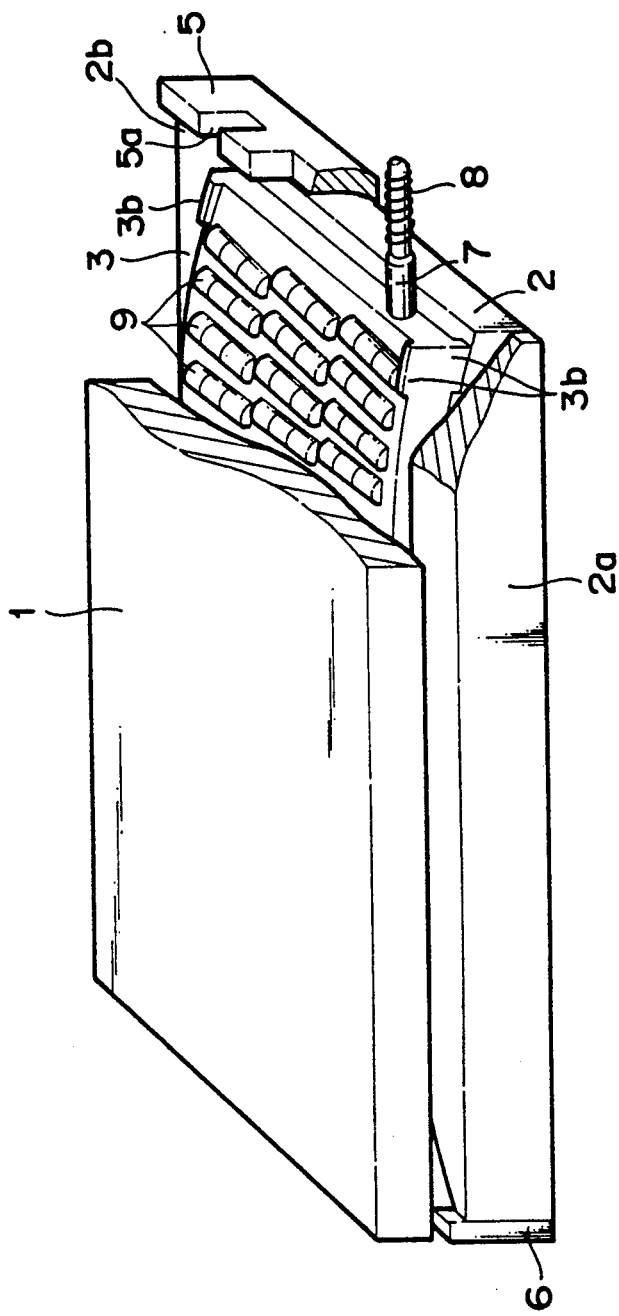
FIG. 2 is a perspective view of the swing ladder bearing according to the present invention with a part thereof being omitted.
Figure 3:
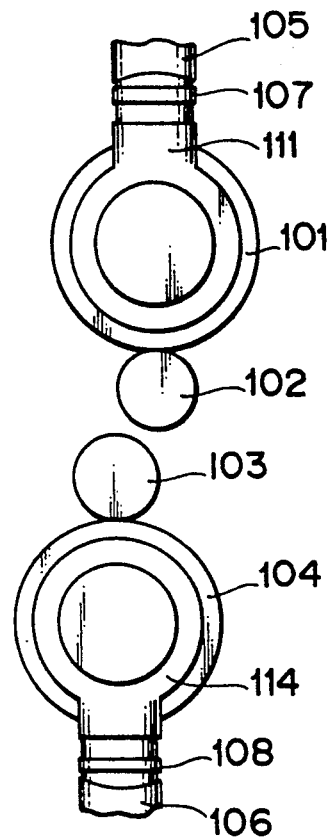
FIG. 3 shows a main portion of a rolling mill having a cross mechanism, viewed from one side thereof.
Figure 4:
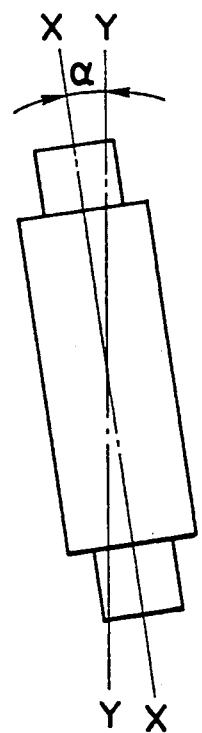
FIG. 4 is a top plan view of a roll which is swung by a cross mechanism.
Figure 5:
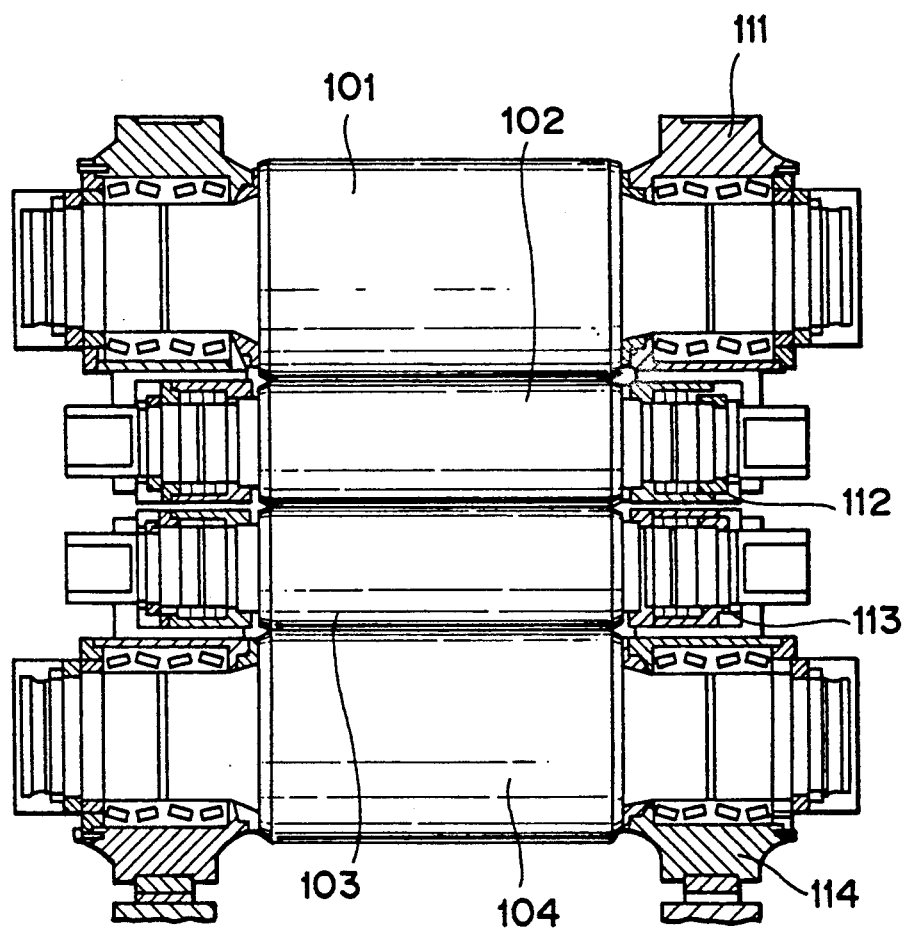
FIG. 5 is a cross-sectional view showing a main portion of a conventional four-stage rolling mill.

FIG. 1 is a front view showing a swing ladder bearing of the present invention with a part thereof being omitted. FIG. 2 is a perspective view of the same, likewise with a part thereof being omitted. As can be seen from FIGS. 1 and 2, an upper trajectory plate 1 and a lower trajectory plate 2 are arranged opposite to each other. Both of the trajectory plates are made of a rectangular flat material. The upper trajectory plate 1 is charged with a load from the above by a pressing device, not shown, while the lower trajectory plate 2 is supported by an upper stay roll chock, not shown. The trajectory plates were selected to be rectangular because this is the most suitable shape for their mounting positions, and also because as many rolling bodies as possible, later described, are ensured so as to be resistant to heavy loads. The lower trajectory plate 2 is provided with a collar member 2a having a convex arc and a collar member 2b having a concave arc, attached to the respective sides thereof. With the collar members 2a, 2b, a groove 2c is formed in the lower trajectory plate 2. The arcs of the collar members 2a, 2b are made equal to the swing radius of the rolls. Incidentally, since the collar members are susceptible to wear, it is desirable that they have undergone a surface curing processing by means of chrome plating or the like.

Within the groove 2c between the upper trajectory plate 1 and the lower trajectory plate 2, there are provided retainers 3, 4 having the same shape movably along the groove 2c. The retainers 3, 4 are respectively formed with three rows of rectangular pockets 3a, with each row including seven pockets. In each of the pockets 3a, a series of three cylindrical rollers 9 are fitted in a manner rotatable in the pocket. The axis of each roller 9 is oriented so as to pass the centers of arcs of grooves 1a and 1b (not shown), respectively. The cylindrical rollers 9 are arranged between the upper trajectory plate 1 and the lower trajectory plate 2 such that they support a load from a pressing device, not shown, as well as alleviate a frictional force acting between the upper trajectory plate 1 and the lower trajectory plate 2 in the direction along the groove and help their relative movements (swing motion).

In end portions of the respective retainers 3, 4 in the moving direction, there are formed along the groove 2c protrusions 3b and 4b which extend vertically as well as upwardly and downwardly. The protrusions 3b and 4b abut transfer faces of the cylindrical rollers 9 in the groove 2c of the lower trajectory plate 2 to support the retainers 3, 4, and also serve as guiding faces for smoothing the swing motions of the retainers 3, 4. Between the protrusions 3b and 4b, there are formed oil grooves. This structure prevents the retainers 3, 4 from contacting with the entire transfer faces of the cylindrical rollers 9, thereby ensuring smooth transfer of the cylindrical rollers 9.

To the ends of the lower trajectory plate 2, there are attached plate members 5, 6, respectively, serving as stoppers which are constructed to prevent the retainer 3 or 4 from dropping from the edges of the lower trajectory plate 2 when they are swinging.

The plate members 5, 6 have notches 5a, 6a at places, and centering mechanisms are arranged such that each of them is supported by one notch 5a formed in the plate member 5 and corresponding one in the plate member 6. The centering mechanisms are each formed by a push rod 7 and a spring member 8. The push rod 7, which comprises a larger cylinder and a smaller cylinder coupled in series, has the tip abutted to the retainer. The spring member 8 is wound around the outer periphery of the smaller cylinder to urge the larger cylinder away from a mill housing (not shown). There are provided five of the push rods 7 and the spring members 8 which urge the retainers 3, 4 from both sides such that the retainers 3, 4 are always directed to a neutral position shown in FIG. 1.

Next, the operation of the swing ladder bearing according to the present invention will be explained with reference to FIGS. 1 and 2.

When the upper trajectory plate 1 is applied with a load from a pressing device, not shown, and also receives a horizontal force from a cross mechanism, not shown, the retainers 3, 4 and the cylindrical rollers 9 start moving along the groove 2c of the lower trajectory plate 2, whereby the upper trajectory plate 1 draws an arcuate trajectory. This allows the roll chocks to smoothly perform swing motions.

Theoretically, the moving amount of the swinging retainers is half as much as the moving amount of the upper trajectory plate 1. However, even if the upper trajectory plate 1 excessively moves, the plate member 5 prohibits the retainers 3, 4 from further moving, thus preventing malfunctions caused by the dropped retainers.

When the upper trajectory plate 1 excessively swings as described above, or when frictional forces acting on the cylindrical rollers 9 are subtly different between going and returning, the retainers 3, 4 do not always return to the neutral position even if the upper trajectory plate 1 has returned to the neutral position. To cope with this problem, the centering mechanisms 7, 8 are utilized to constantly urge the retainers 3, 4 toward the neutral position, thereby making it possible to return the retainers 3, 4 to the neutral position within several swing motions even in the case as mentioned above. Incidentally, the use of a single retainer will cause a tensile or the like to occur in the retainer (particularly between pockets) if frictional forces acting on the respective cylindrical rollers are not uniform, which may possibly result in destroying the retainer or disturbing smooth operations. For this reason, the present embodiment employs two retainers, however, three or more retainers may be provided to avoid such inconveniences.

While the present invention has been described in detail in connection with the preferred embodiment thereof, it goes without saying that the present invention should not be construed to be limited to the foregoing embodiment, and modification and so on may be possible within the scope of the present invention. For example, the rotating body may be a ball member other than the cylindrical roller as employed in the foregoing embodiment, and the centering mechanism may utilize an air spring, not a mechanical spring. Further, the collar members may be provided not only on the lower trajectory plate but also on the upper trajectory plate.

According to the swing ladder bearing of the present invention so far described in detail, since the trajectory plates are rectangular, they can be securely mounted to a portion of a rolling mill having a cross mechanism which is urged by a pressing device. Also, the retainers have pockets for retaining the rolling bodies arranged in a plurality of rows, with the center line of each pocket passing the center of the swing motion, thereby rendering the swing ladder bearing appropriate to the swing motion of the rolling mill. Further, since the centering mechanisms, the collar members and the stoppers are provided for the retainers, malfunctions can be effectively prevented.

What is claimed is:

1. A swing ladder bearing having a pair of rectangular trajectory plates subjected to an axial load; rolling bodies rotatably arranged between said pair of trajectory plates; a plurality of retainers for retaining said rolling bodies; and centering mechanisms for urging said retainers toward a neutral position, one of said pair of trajectory plates adapted to swing with respect to the other trajectory plate, said swing ladder bearing further comprising:

collar members attached to at least one of said pair of trajectory plates for guiding swing motions of said retainers caused by swing motions of said one trajectory plate;

stoppers attached to at least one of said pair of trajectory plates for preventing said retainers from excessively swinging; and pockets arranged in a plurality of rows in said retainers for retaining said rolling bodies, said each pocket being inclined such that the center line thereof passes the center of the swing motion, and said retainers each being divided into a plurality of segments which are symmetric about the bearing center.

* * * * *